United States Patent [19]
Imran

[11] Patent Number: 5,179,570
[45] Date of Patent: Jan. 12, 1993

[54] DIRECT SEQUENCE SPREAD SPECTRUM COMMUNICATION SYSTEM WITH SELF-SYNCHRONIZING CORRELATOR AND METHOD

[76] Inventor: Mir A. Imran, 731 Barron Ave., Palo Alto, Calif. 94306

[21] Appl. No.: 732,655

[22] Filed: Jul. 19, 1991

[51] Int. Cl.$^5$ .............................................. H04K 1/00
[52] U.S. Cl. ......................................... 375/1; 380/34; 380/50
[58] Field of Search .................. 380/34, 48, 50; 375/1

[56] References Cited

U.S. PATENT DOCUMENTS

| | | | |
|---|---|---|---|
| 4,630,283 | 12/1986 | Schiff | 375/1 |
| 4,669,089 | 5/1987 | Gahagan et al. | 375/1 |
| 4,841,544 | 6/1989 | Nuytkens | 375/1 |
| 4,930,139 | 5/1990 | Chandler et al. | 375/1 |
| 5,081,645 | 1/1992 | Resnikoff et al. | 375/1 |

*Primary Examiner*—Tod R. Swann
*Attorney, Agent, or Firm*—Flehr, Hohbach, Test, Albritton & Herbert

[57] ABSTRACT

Spread spectrum communication system comprising a transmitter for transmitting data in bit form from one location to a remote location. An encoder is provided for encoding the data with a chip sequence at a predetermined clock rate to provide encoded data which is transmitted to the remote location. A receiver is provided at the remote location for receiving the encoded data. The receiver includes a correlator having a shift register for storing a chip sequence on the encoded data in bit form at least three sequential times. A decoder is provided for polling the shift register during the three sequential times of the stored chip sequence in bit form at a clock rate of at least three times that of the clock rate of the chip sequence to ascertain whether a majority of the corresponding chips of the chip sequence stored in the shift register at the at least three sequential times are the same to provide an output. A comparator is provided for comparing the output with the corresponding chip of the transmitted chip sequence to ascertain whether they are the same and with an inverted chip corresponding to the chip of the transmitted chip sequence to ascertain whether they are the same to provide compared data. A summer is provided for summing the compared data to provide summed data, and an adjustable threshold is provided for determining when the summed data constitutes a valid data bit.

5 Claims, 3 Drawing Sheets

FIG.—2

DIRECT SEQUENCE SPREAD SPECTRUM COMMUNICATION SYSTEM WITH SELF-SYNCHRONIZING CORRELATOR AND METHOD

This invention relates to a direct sequence spread spectrum communication system and more particularly to one utilizing a self-synchronizing correlator and a method.

In the past, numerous types of spread spectrum systems have been proposed and utilized. In such systems the carrier is modulated by a code sequence. The code sequence is typically long and determines the bandwidth of the carrier. The receiver utilized in such systems must have a bandwidth large enough to accommodate the bandwidth of the transmitted signal. The code sequence utilized must also be embedded in the receiver's demodulator. In order to properly decode the transmitted data in existing direct sequence receivers, the receiver must synchronize its chip sequence to that of the receiver chip sequence. Several synchronization techniques have been disclosed in the literature, the most common being the "Sliding Correlator." In such a correlator, the clock of the correlator had to be synchronized with the clock rate of the chip sequence utilized in the receiver system. This has been found to be a very difficult process. Feedback control loops have been utilized to facilitate this synchronization. The chip sequence's clock rate is passed across the comparators, and at the same time a built-in sequence in the receiver with its clock rate is also passed across the comparators. Thus the sequences are passed across the comparators at two different clock rates. When the difference between the two clock rates is small enough, the clock rate in the receive will lock into the clock rate of the chip sequence being received. The frequency of the receiver is then fixed at that point and correlation is achieved. This matching of clock rates, however, is an iterative process which in most spread spectrum systems requires the utilization of several dozen data bits. Even in the best systems, only a fewer number of data bits is required. Such synchronization results in lost time in establishing synchronization. Even after synchronization is achieved, it is necessary to maintain a very accurate clock frequency in the receiver. There is therefore a need for a new and improved spread spectrum system which incorporates a self-synchronizing correlator and a method for accomplishing the same.

Another object of the present invention is to provide a system and method of the above character in which a clock frequency at least three times that of the chip rate is utilized.

Another object of the present invention is to provide a system and method of the above character in which the higher clock rate is used for shifting chip information in a shift register.

Additional objects and features of the invention will appear from the following description in which the preferred embodiments are set forth in detail in conjunction with the accompanying drawings.

In general, the spread spectrum system and apparatus consists of a transmitter for transmitting data in bit form from one location to a remote location. Means is provided for encoding the data with a chip sequence at a predetermined clock rate to provide encoded data which is transmitted to the remote location. A receiver is provided at the remote location for receiving the encoded data. The receiver includes a correlator that is comprised of a shift register for storing a chip sequence in the encoded data in bit form at least three sequential times. Means is provided for polling the shift register during the three sequential times the stored chip sequence in bit form therein at a clock rate of at least three times that of the clock rate of the chip sequence to ascertain whether a majority of the corresponding bits of the chip sequence stored at the three sequential times are the same to provide an output. Means is provided for comparing the output with the corresponding bit of the transmitted chip sequence to ascertain whether they are the same, and the output with an inverted corresponding bit of the transmitted chip sequence to ascertain whether they are same to provide compared data. Means is provided for summing the compared data to provide summed data. Adjustable threshold means is provided for determining when the summed data constitutes a valid data bit.

Figure 1:
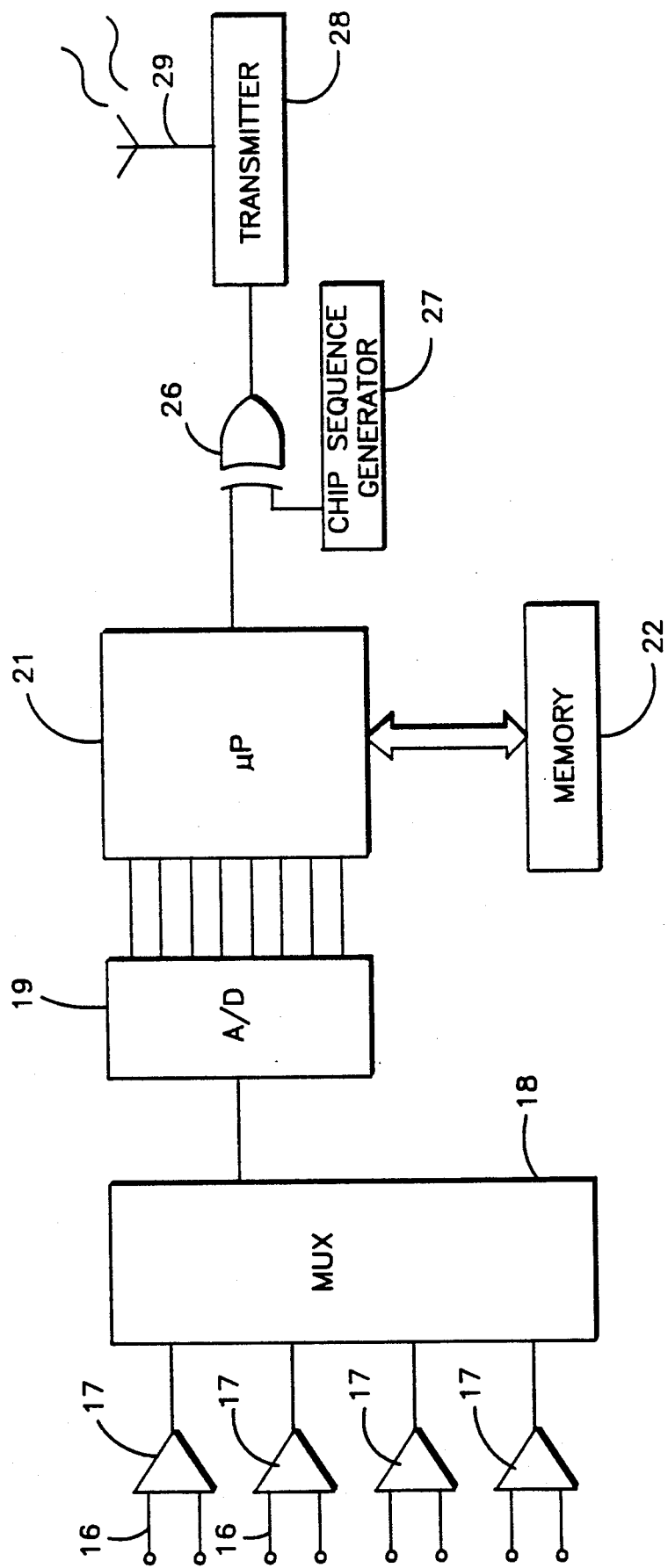
FIG. 1 is a block diagram of a transmitter for use in a spread spectrum telemetry system incorporating the present invention.
Figure 2:
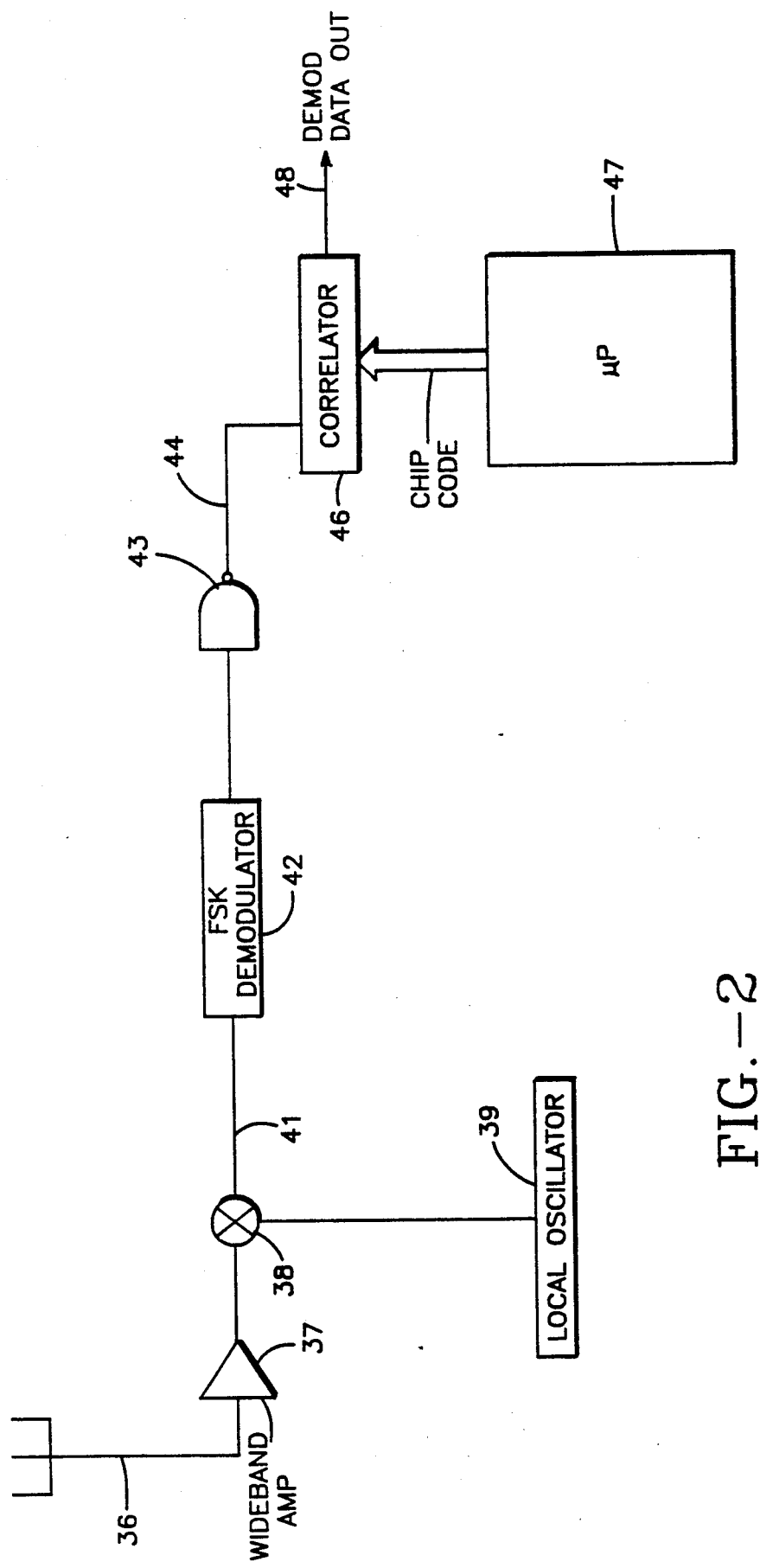
FIG. 2 is a block diagram of the receiver for utilization in a spread spectrum telemetry system incorporating the present invention.

More particularly, the direct sequence spread spectrum communication system and apparatus of the present invention as shown in FIG. 1 is comprised of a transmitter 11 and a receiver 12. The transmitter 11 is provided with a plurality of inputs 16 which can be outputs from various sensors which provide analog outputs that are supplied to amplifiers 17. The outputs of the amplifiers 17 are supplied to an analog multiplexer 18. The output of the multiplexer 18 is supplied to an analog-to-digital converter 19 of a suitable type, as for example an 8-bit analog-to-digital converter. The outputs from the analog-to-digital converter 19 are supplied to a microprocessor 21 with its associated memory 22. The microprocessor 21 is utilized for serializing the data which is supplied to it in binary or digital form from the A-to-D converter 19 which supplies the serialized data on a data line 23 to one input of an exclusive OR gate 26. The other input of the exclusive OR gate 26 is connected to a chip sequence generator 27.

Each data bit coming out of the microprocessor 21 is encoded with a very long chip sequence typically called a pseudo-random code. The chip sequence provided by the chip sequence generator 27 can be of any suitable length, as for example from 100 to 1000 chips for each data bit. The chip sequence utilized serves to encode the bit data supplied from the microprocessor. It also serves to spread the bandwidth of the transmitted signal. The output of the exclusive OR gate 26 is supplied to a transmitter 28 which transmits the encoded to the remote location where the receiver 12 is located. The transmission to the remote site can be by any suitable means, as for example by use an antenna 29 to permit the use of radio frequencies. The exclusive OR gate 26 serves to transmit the digital data in a conventional form, that is, when the data bit is a "one", the chip sequence is transmitted as it is. When the data bit is "zero", the chip sequence is inverted. This makes it possible for the receiver to differentiate between a "zero" data bit and a "one" data bit.

The encoded data transmitted to the transmitter 28 can be transmitted in a conventional manner, as for example by causing the exclusive OR gate 26 to modulate a frequency shift keying (FSK) source which modulates the carrier frequency of the transmitter 28 to provide a direct sequence spread spectrum.

In the present invention, the spread spectrum technique is utilized for transmitting the data bits to achieve security by making it difficult to eavesdrop on the transmitted data. One of the principal advantages in the present invention is that each data bit is represented by a very long chip sequence, which in fact is a large number of bits. Therefore the destruction of some of these bits will not affect the integrity of the data being transmitted. This makes it possible to accurately transmit data bits in the presence of noise. In other words, this system can operate in a noisy environment.

The receiver 12 is provided with a broad band antenna 36 which is connected into a wide band amplifier 37, the output of which is supplied to the mixer 38. The mixer 38 is provided with a frequency from a local oscillator 39 which typically is above the received frequency to provide on an output line 41 an intermediate frequency which is of lower frequency than the received frequency. This intermediate frequency is supplied to an FSK demodulator 42 to provide sequences of chips, with each complete sequence of chips representing one data bit, either a zero or a one. These chip sequences are supplied through a Schmidt trigger 43. The output of the Schmidt trigger 43 is supplied to a correlator 46 which is controlled by a microprocessor 47. The correlator 46 has an output 48 on which valid data from the correlator is supplied.

Figure 3:
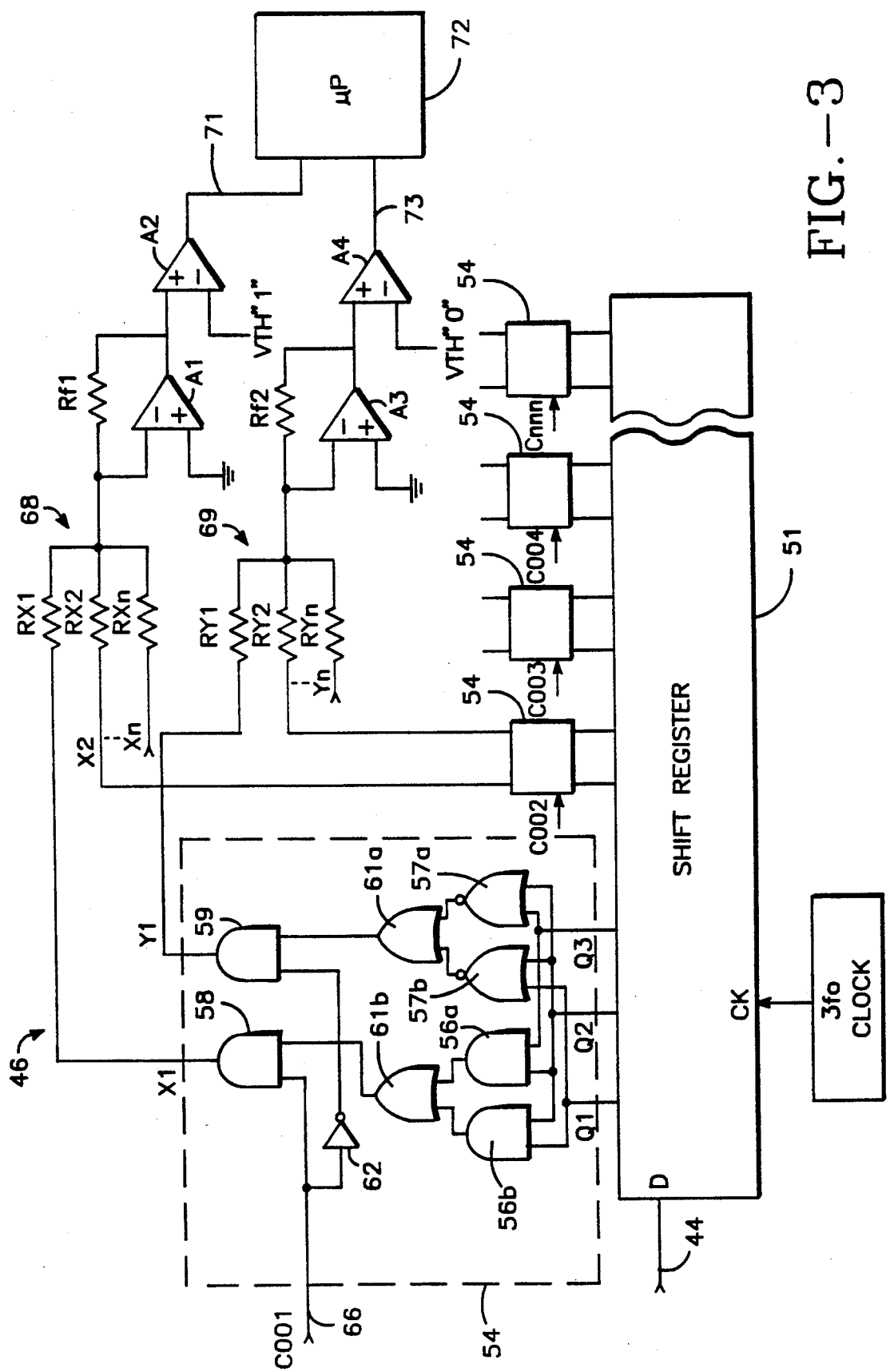
FIG. 3 is a block diagram of the self-synchronizing correlator utilized in the receiver shown in FIG. 2 of the spread spectrum telemetry system of the present invention.

A block diagram of the correlator 46 is shown in FIG. 3. As shown therein, the input 44 to the correlator 46 is connected to the input of a shift register 51. The shift register 51 has a length which is at least three times the length of a transmitted chip sequence and is provided for storing a chip sequence in the encoded data in bit form at least at three sequential times. The shift register 51 is polled or sampled under the direction of a clock 52 which has a frequency at least three times that of the clock rate used for the chip sequence. Thus, by way of example, if it is desired to utilize a longer shift register, as for example one capable of storing a chip sequence at least five sequential times, then a clock 52 is used having a clock rate of at least five times the sequence clock rate. As previously described, it is assumed that the shift register has a length so that it can store the encoded data in bit form at least at three sequential times. Using a chip sequence in the transmitter one thousand chips long, the shift register would have 3000 shift registers. Such a shift register can be readily constructed utilizing integrated circuits.

A decoding circuit 54 is provided for each three locations in the shift register 51. The specific circuit elements for each decoding circuit 54 are shown in the broken-line box 54 in FIG. 3 for the first three locations in the shift register 51. Three of the outputs from the first three locations in the shift register 51 have been brought out and identified as Q1, Q2 and Q3. These are connected to two AND gates 56a and 56b, and two NOR gates 57a and 57b. The outputs of AND gates 56a and 56b are connected to OR gate 61b. The outputs of NOR gates 57a and 57b are connected to OR gate 61a. The AND gates 56a and 56b compare the two consecutive outputs to provide a signal when two of the outputs are equal to a logical one, and the OR gates 57a and 57b are utilized to compare the outputs Q1, Q2 and Q3 for two consecutive zeros.

Each circuit or box 54 is provided with an input 66 which has hard-wired into it an appropriate chip of the chip sequence. The first chip of the chip sequence which has been identified as C001 is wired into the first box 54. Each chip of the chip sequence has three locations in the shift register 51 and in one of the boxes 54. Thus, with one thousand chips in each chip sequence there would be provided 3000 shift register locations and 1000 boxes 54 with the last box being numbered C3000, or Cnnn as shown in FIG. 3. As it can be seen, the detailed circuitry for one of boxes 54 is shown in the first box 54 in FIG. 3. The circuitry in the remaining boxes is the same.

The AND gates 56a and 56b compare the outputs Q1, Q2 and Q3, and go high if Q1 and Q2 are high or if Q2 and Q3 are high. The outputs of AND gates 56a and 56b are coupled to an OR gate 61b whose output will go to a one if two consecutive outputs from the shift register 51 are high. Similarly, NOR gates 57a and 57b are utilized to look for two consecutive zeros. The outputs of NOR gates 57a and 57b are coupled to an OR gate 61a whose output goes high if two of the consecutive outputs from the shift register are high. The particular chip, in this case chip C001 of the chip sequence, is coupled to two additional AND gates 58 and 59. The output of AND gate 58 goes high if two consecutive outputs Q1 and Q2 or Q2 and Q3 are high and if the chip is also high. For example, if the chip C001 was a one, AND gate 58 would go high if Q1 and Q2 are high or if Q2 and Q3 are high. Similarly, AND gate 59 is utilized to detect a zero match between chip C001 and the output of OR gate 61a. Thus it can be seen that the outputs of AND gates 58 and 59, which are labeled $X_1$ and $Y_1$ respectively, provide a signal that indicates whether a match was achieved between a chip and two consecutive outputs of the shift register. Thus if there is a match between the first chip from the shift register and the chip from the hard-wired chip sequence to produce a logical "one", the chip on the input line 66 is inverted by an inverter 62 and supplied to the AND gate 58. Thus, if both inputs to the AND gate 59 are high, this means that the chip sequence was a logical "zero".

The other boxes 54 operate in a similar manner as far as sampling and polling of the shift register 51 occurs under the control of the clock frequency from the clock 52. All of the X outputs ($X_1 \ldots X_n$) are summed in a summing network 68 consisting of resistors $RX_1 \ldots RX_n$, and similarly the Y outputs are summed in a summing network 69 consisting of resistors $RY_1, RY_2, \ldots RY_n$. As pointed out previously, the X outputs represent a match of ones and are all high if the data bit was a one. Similarly the Y outputs are all high if the data bit was a zero. This is accomplished because, as explained previously, the inverter 62 is utilized to invert each chip to provide a 180° phase shift. Each inverted chip is fed to the gate 59. The summed X outputs are delivered to a summing amplifier A1, whereas the summed Y outputs are delivered to a summing amplifier A3. Summing amplifiers A1 and A3 are provided with feedback resistances $Rf_1$ and $Rf_2$ respectively. As the number of random matches increases, the voltage output from the summing amplifier A1 will increase. The output of the summing amplifier A1 is supplied to a threshold detector A2 which is provided with a variable threshold voltage identified as $V_{TH"0"}$, and similarly the output of the summing amplifier A3 is supplied to a threshold detector A4 which is provided with a variable or adjustable threshold voltage $V_{TH"1"}$. The threshold voltages can be set at predetermined values in order to achieve the desired reliability from the data being produced. Thus, by way of example, the threshold voltages could be adjusted so that when the voltage from the summing amplifier represents 75% of the total matches which can be achieved between the chip sequence in the transmitted encoded data and the chip sequence in the receiver, it can be considered that valid data has been received and to provide an output on the line 71 which is supplied to a microprocessor 72 or other similar processing device. Similarly, the output from the threshold amplifier A4 is supplied on an output 73 to the microprocessor 72.

From the foregoing method it can be seen that the chips have been discarded and the data has been reconstructed from the chip sequences supplied from the transmitter to the receiver. A correlator is provided which is self-synchronizing and which will self-synchronize in a very short period of time.

What is claimed is:

1. In a spread spectrum system, a transmitter for transmitting data in bit form from one location to a remote location, means for encoding the data with a chip sequence at a predetermined clock rate to provide encoded data which is transmitted to the remote location, a receiver at the remote location for receiving the encoded data, said receiver including a correlator which includes means for storing a chip sequence on the encoded data in bit form at least three sequential times, means for polling the means for storing a chip sequence during the three sequential times of the stored chip sequence in bit form at a clock rate of at least three times that of the clock rate of the chip sequence to ascertain whether the majority of the corresponding chips of the chip sequence stored in the means for storing from the at least three sequential times are the same to provide an output, means for comparing the output with the corresponding chip of the transmitted chip sequence to ascertain whether they are the same and with an inverted chip corresponding to the chip of the transmitted chip sequence to ascertain whether they are the same to provide compared data, means for summing the compared data to provide summed data and adjustable threshold means for determining when the summed data constitutes a valid data bit.

2. In a spread spectrum system, a transmitter for transmitting data in bit form from one location to a remote location, means for encoding the data with a chip sequence at a predetermined clock rate to provide encoded data which is transmitted to the remote location, a receiver at the remote location for receiving the encoded data, said receiver including a correlator which includes means for storing a chip sequence on the encoded data in bit form at least three sequential times, means for polling the means for storing a chip sequence during the three sequential times of the stored chip sequence in bit form at a clock rate of at least three times that of the clock rate of the chip sequence to ascertain whether the majority of the corresponding chips of the chip sequence stored in the means for storing from the at least three sequential times are the same to provide an output, means for comparing the output with the corresponding chip of the transmitted chip sequence to ascertain whether they are the same and with an inverted chip corresponding to the chip of the transmitted chip sequence to ascertain whether they are the same to provide compared data, means for summing the compared data to provide summed data, and adjustable threshold means for determining when the summed data constitutes a valid data bit, said means for storing consisting of a shift register having a length so that it can store at least three chip sequences, said means for polling including a plurality of circuits coupled to the shift register with a circuit being provided for each chip of the at least three chip sequences stored in the shift register, the shift register having at least three outputs for each chip of the chip sequence, and means in each of the circuits for comparing the outputs from the shift register and including an AND gate and a NOR gate and providing an output when the signals on two of the outputs on the shift register are equal, and OR gates connected to the outputs of the AND and NOR gates, first and second AND gates connected to the outputs of the OR gates, a chip of the chip sequence hard-wired into the circuit, means for supplying said chip to one of the inputs of one of the first and second AND gates, means for inverting said chip and supplying it to the other of the first and second AND gates, said first and second AND gates having X and Y outputs respectively, said means for summing the compared data including means for summing the X outputs and for summing the Y outputs independently of each other and clock means coupled to the shift register operating at a frequency which is three times the chip sequence clock rate.

3. In a correlator for use in a spread spectrum receiver for receiving encoded data which has data therein encoded with a chip sequence at a predetermined clock rate, shift register means for storing a chip sequence in coded data in bit form at least at three sequential times, a clock coupled to said shift register and having a frequency which is at least three times that of the clock rate of the chip sequence, decoding circuits coupled to the shift register and having outputs from the shift register coupled to the decoding circuits having one output for each of the three sequential times, said decoder circuit including AND and NOR gates having first and second inputs connected to two of the outputs from the shift register and providing an output signal when the inputs are equal, OR gates connected to the outputs of the AND and NOR gates, first and second AND gates connected t the outputs of the OR gates, means for supplying a chip of the chip sequence to the first and second AND gates with the chip being connected to the first AND gate in direct form and connected to the other input of the other AND gate in an inverted form, said first and second AND gates having X and Y outputs, means for summing the X outputs, means for summing the Y outputs, means for determining when the summed X outputs reach a predetermined value to decide that a valid data bit is present on the X outputs, means for ascertaining when the Y outputs reach a predetermined value to determine that a valid data bit is present on the Y outputs and means for receiving the valid data bits from the X and Y outputs for processing the same.

4. A method for use with a spread spectrum communication system for transferring data in bit form from one location to a remote location, encoding the data at one location with a chip sequence at a predetermined clock rate to provide encoded data, transmitting the encoded data to the remote location, receiving the encoded data at the remote location, storing a chip sequence in the encoded data in bit form at least at three sequential times, polling during the three sequential times the stored chip sequence in bit form at a clock rate of at least three times that of the clock rate of the chip sequence to ascertain whether a majority of the corresponding chips of the chip sequence stored during the three sequential times of stored chip sequence to ascertain whether a majority of the corresponding chips of the chip sequence stored in the three sequential times are the same to provide an output, comparing the output with the corresponding transmitted chip sequence to ascertain whether they are the same and with an inverted corresponding chip to ascertain whether they are the same to provide compared data, summing the compared data to provide summed data and ascertaining when the summed data constitutes a valid data bit.

5. A method for use with a spread spectrum communication system for transferring data in bit form by a transmitter from one location to a receiver at a remote location, supplying a chip sequence to the transmitter and the same chip sequence to the receiver, encoding the data at the transmitter with the predetermined chip sequence at a predetermined clock rate to provide encoded data, receiving the encoded data in the receiver, and examining the received encoded data at a clock rate which is at least three times that of the clock rate of the chip sequence, polling three consecutive samples to ascertain whether a majority of the corresponding samples are the same to provide improved reliability so that it can be readily ascertained when a valid data bit has been received.

* * * * *